US009636958B2

(12) United States Patent
Patterson et al.

(10) Patent No.: US 9,636,958 B2
(45) Date of Patent: May 2, 2017

(54) EXTENDABLE COMPARTMENT TRAILER ASSEMBLY AND METHODS OF OPERATION THEREOF

(71) Applicants: Geoff Patterson, Newhall, CA (US); Grant Nelson, Valencia, CA (US)

(72) Inventors: Geoff Patterson, Newhall, CA (US); Grant Nelson, Valencia, CA (US)

(73) Assignee: Hitch Hotel Inc., Valencia, CA (US)

( * ) Notice: Subject to any disclaimer, the term of this patent is extended or adjusted under 35 U.S.C. 154(b) by 0 days.

(21) Appl. No.: 14/708,137

(22) Filed: May 8, 2015

(65) Prior Publication Data

US 2015/0321716 A1 Nov. 12, 2015

Related U.S. Application Data

(60) Provisional application No. 61/992,102, filed on May 12, 2014.

(51) Int. Cl.
*B60P 3/32* (2006.01)
*B60P 3/34* (2006.01)
(Continued)

(52) U.S. Cl.
CPC ........... *B60D 1/36* (2013.01); *B60P 3/32* (2013.01); *B60P 3/34* (2013.01); *B62D 63/06* (2013.01); *B62D 63/061* (2013.01)

(58) Field of Classification Search
CPC ...... B60P 3/32; B60P 3/34; B60P 3/40; B60P 3/42; B60R 5/04; B60R 5/041;
(Continued)

(56) References Cited

U.S. PATENT DOCUMENTS 2,210,540 A * 8/1940 Nielson ............... A47C 17/80
135/96
2,249,845 A * 7/1941 Mitchell ............... A47B 3/14
108/129
(Continued)

FOREIGN PATENT DOCUMENTS

EP 0825305 A1 2/1998
RU 109708 U1 10/2011

OTHER PUBLICATIONS

International Search Report and Written Opinion dated Aug. 27, 2015, regarding PCT/US2015/030183.

Primary Examiner — Gregory Blankenship
(74) Attorney, Agent, or Firm — Lewis Roca Rothgerber Christie LLP

(57) ABSTRACT

An extendable compartment assembly having a first compartment and a second compartment each having opposing sidewalls and a ceiling, a first frame coupled to the first compartment, a second frame coupled to the second compartment, and a slide assembly coupling the first frame to the second frame such that the second compartment is slideable relative to the first compartment between a first position and a second position. In the first position, the second compartment is at least partially disposed within the first compartment and in the second position the second compartment is at least partially disposed outside the first compartment. A hitch assembly comprising a base arm having first and second ends, a first mating arm coupled with the first end, a second mating arm coupled with the second end, and a bias member coupling the first mating arm to the second mating arm.

20 Claims, 11 Drawing Sheets

(51) Int. Cl.
*B60D 1/36* (2006.01)
*B62D 63/06* (2006.01)

(58) Field of Classification Search
CPC .......... B60R 5/042; B60R 9/06; B60R 9/065; B60R 2011/004; B60D 1/36; B62D 63/06; B62D 63/061
USPC .................. 296/26.08, 26.09, 164, 165, 175; 224/488, 499, 518, 519, 525
See application file for complete search history.

(56) References Cited

U.S. PATENT DOCUMENTS

| | | | | |
|---|---|---|---|---|
| 2,913,775 | A | | 11/1959 | Sailor |
| 3,097,013 | A | * | 7/1963 | Mussler ................. B60P 3/38 135/88.13 |
| 3,915,492 | A | * | 10/1975 | Agnese ................. B60P 3/34 296/172 |
| 3,966,075 | A | * | 6/1976 | Schultz ................ B65D 88/005 105/393 |
| 4,279,440 | A | * | 7/1981 | Golding, Sr. ............ B60P 3/38 296/164 |
| 4,784,429 | A | * | 11/1988 | Hodges ................. B60J 7/041 160/202 |
| 4,944,550 | A | * | 7/1990 | Drown ................. B60P 7/02 296/100.05 |
| 5,011,216 | A | * | 4/1991 | Baughman ............. B60P 3/38 135/88.13 |
| 5,052,604 | A | * | 10/1991 | Tourangeau ............ B62J 11/00 224/274 |
| 5,203,603 | A | * | 4/1993 | Hertzberg .............. B60J 7/041 296/100.03 |
| 5,368,396 | A | * | 11/1994 | Cantrell ................ B60J 7/041 16/98 |
| 5,658,032 | A | * | 8/1997 | Gardner ................ B60P 3/34 296/175 |
| 5,673,962 | A | * | 10/1997 | Maieli ................. B60R 15/04 296/164 |
| 5,934,726 | A | * | 8/1999 | Bossett ................ B60P 3/341 135/88.13 |
| 6,039,227 | A | * | 3/2000 | Stark ................. B60R 9/06 206/315.3 |
| 6,067,756 | A | * | 5/2000 | Frerichs ............... E04B 1/3431 296/26.09 |
| 6,095,387 | A | * | 8/2000 | Lipscomb ............... B60R 9/06 224/485 |
| 6,257,638 | B1 | * | 7/2001 | Graber ................. B60P 3/34 296/26.01 |
| 6,524,054 | B2 | * | 2/2003 | Maney ................. B60R 9/06 224/519 |
| 6,561,570 | B2 | * | 5/2003 | Gehman ................ B60P 3/34 296/171 |
| 6,712,248 | B2 | * | 3/2004 | Mitchell ............... B60R 9/06 224/498 |
| 6,817,897 | B2 | * | 11/2004 | Chee .................. H01R 9/0518 439/578 |
| 7,722,104 | B2 | | 5/2010 | Nichols |
| 7,815,083 | B2 | * | 10/2010 | Clausen ............... B60R 9/06 224/497 |
| 8,074,403 | B1 | * | 12/2011 | Mentnech .............. E04B 1/343 296/165 |
| 8,191,743 | B1 | * | 6/2012 | Bowden ................ B60P 3/07 224/310 |
| 8,534,735 | B2 | * | 9/2013 | McManus ............. B62D 31/00 296/26.08 |
| 8,919,626 | B1 | * | 12/2014 | Smith ................. A61G 3/0209 224/519 |
| 2008/0265618 | A1 | * | 10/2008 | Cadena ................ B60P 3/34 296/175 |
| 2011/0266773 | A1 | | 11/2011 | Swanson |
| 2013/0015679 | A1 | * | 1/2013 | Jones ................. B60P 3/34 296/175 |
| 2015/0321716 | A1 | * | 11/2015 | Patterson ............... B60D 1/36 296/26.09 |
| 2016/0121938 | A1 | * | 5/2016 | Richins ................ B60P 3/40 296/26.09 |

\* cited by examiner

EXTENDABLE COMPARTMENT TRAILER ASSEMBLY AND METHODS OF OPERATION THEREOF This application claims priority to U.S. Provisional Application No. 61/992,102, entitled "Hitch Hotel," filed May 12, 2014, which is hereby expressly incorporated by reference herein.

FIELD OF THE INVENTION

Aspects of the invention relate to a vehicle trailer assembly and methods of operation thereof.

BACKGROUND OF THE INVENTION

Automobile trailers, including storage and camping trailers are known in the art. Known trailers are typically hitched to an automobile for transport to a remote location. After hitching the trailer to the automobile, the driver may drive the trailer to the remote location. Many storage trailers and camping trailers are typically large enough to fit one or more adult people, equipment, or other large objects, and may have a length from between 6 to 12 feet behind the automobile. Such trailers require large road-capable wheels for transport. Furthermore, when transporting large trailers, the operator is typically subjected to additional speed and lane restrictions that are not required for vehicles without a trailer. Much smaller storage compartments that may be mounted to a vehicle such as on top or on the rear do not require wheels and do not require speed and lane restrictions. However, such storage compartments do not have enough storage capacity for larger objects such as one or more adult people.

Thus, there is a need in the art for an extendable compartment trailer assembly that is small enough to not require road wheels during transport, but can be extended to have enough storage volume to hold large objects such as one or more adult people.

SUMMARY OF THE INVENTION

Aspects of the present invention provide an extendable compartment trailer assembly comprising a first compartment having opposing sidewalls and a ceiling, a second compartment having opposing sidewalls and a ceiling, a first frame coupled to the first compartment, a second frame coupled to the second compartment, and a slide assembly coupling the first frame to the second frame such that the second compartment is slideable relative to the first compartment between a first position and a second position. In the first position the second compartment is at least partially disposed within the first compartment and in the second position the second compartment is at least partially disposed outside the first compartment.

Aspects of the present invention also provide an extendable compartment assembly comprising a first compartment having opposing sidewalls and a ceiling, a second compartment having opposing sidewalls and a ceiling, a third compartment having opposing sidewalls and a ceiling, a first frame coupled to the first compartment, a second frame coupled to the second compartment, a third frame coupled to third compartment, a first slide assembly coupling the first frame to the second frame such that the second compartment is slideable relative to the first compartment between a first position and a second position, and a second slide assembly coupling the second frame to the third frame such that the third compartment is slideable relative to the second compartment between a third position and a fourth position. In the first position the second compartment is at least partially disposed within the first compartment and in the second position the second compartment is at least partially disposed outside the first compartment. In the third position the third compartment is at least partially disposed within the second compartment and in the fourth position the third compartment is at least partially disposed outside the second compartment.

Aspects of the present invention also provide a hitch assembly comprising a base arm having a first end and an opposing second end, a first mating arm coupled with the first end of the base arm, a second mating arm coupled with the second end of the base arm, and a bias member coupling the first mating arm to the second mating arm.

Aspects of the present invention also provide a hitch assembly comprising a base arm having a first end opposing a second end, and a longitudinal axis extending from the first end to the second end, a first mating arm having an elongated portion and a coupling portion extending substantially perpendicularly to the elongated portion, the coupling portion of the first mating arm being coupled with the first end of the base arm, a second mating arm having an elongated portion and a coupling portion extending substantially perpendicularly to the elongated portion, the coupling portion of the second mating arm being coupled with the second end of the base arm, and a bias member coupling the first mating arm to the second mating arm and extending substantially in a direction of the longitudinal axis of the base arm.

Aspects of the present invention also provide an extendable compartment and hitch assembly comprising an extendable compartment assembly and a hitch assembly. The hitch assembly comprises a first compartment, a second compartment, a first frame coupled to the first compartment, a second frame coupled to the second compartment, and a slide assembly coupling the first frame to the second frame such that the second compartment is slideable relative to the first compartment between a first position and a second position. The hitch assembly comprises a base arm having a first end and an opposing second end, a first mating arm coupled with the first end of the base arm, a second mating arm coupled with the second end of the base arm, and a bias member coupling the first mating arm to the second mating arm. The hitch assembly is coupleable with the extendable compartment assembly

DETAILED DESCRIPTION

Figure 1:
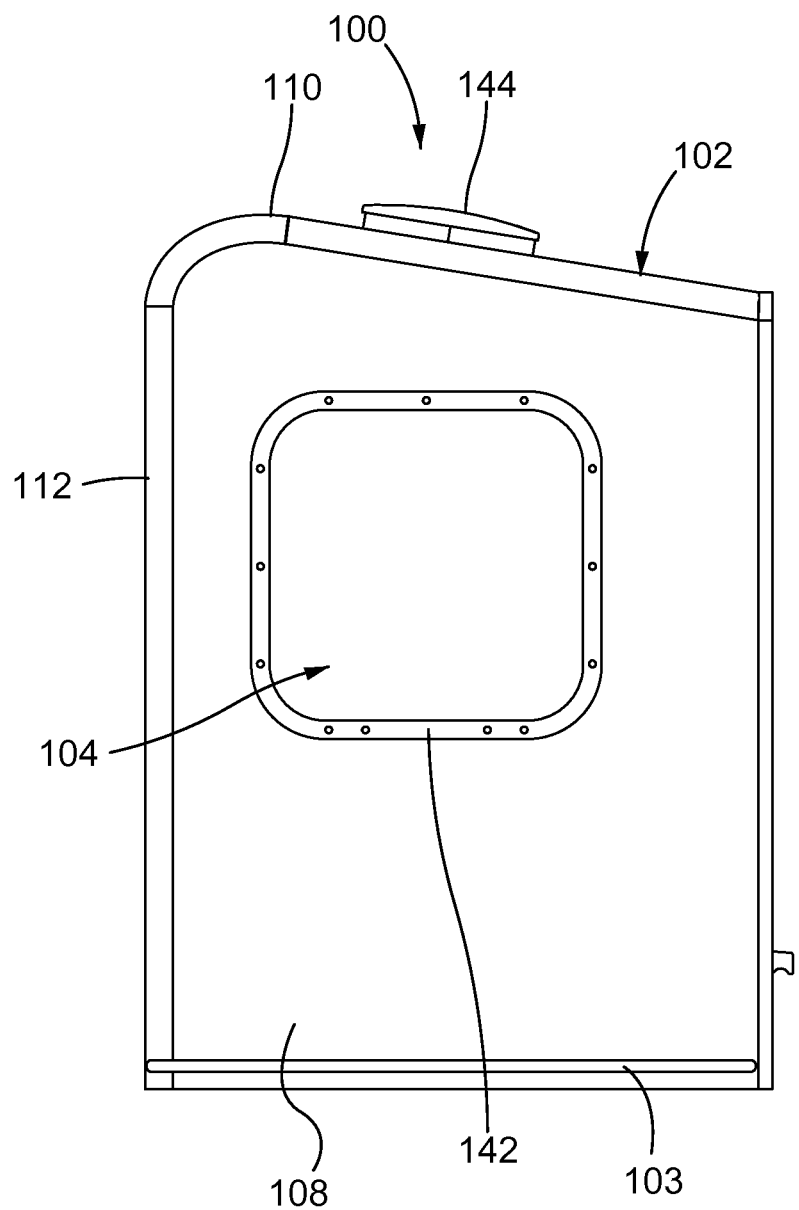
FIG. 1 is a side view of an extendable compartment trailer assembly in a fully retracted position, in accordance with aspects of the present invention.

Aspects of the present invention provide an extendable compartment trailer assembly comprising a first compartment having opposing sidewalls and a ceiling, a second compartment having opposing sidewalls and a ceiling, a first frame coupled to the first compartment, a second frame coupled to the second compartment, and a slide assembly coupling the first frame to the second frame such that the second compartment is slideable relative to the first compartment between a first position and a second position. The first position the second compartment is at least partially disposed within the first compartment and in the second position the second compartment is at least partially disposed outside the first compartment.

Aspects of the present invention also provide an extendable compartment assembly comprising a first compartment having opposing sidewalls and a ceiling, a second compartment having opposing sidewalls and a ceiling, a third compartment having opposing sidewalls and a ceiling, a first frame coupled to the first compartment, a second frame coupled to the second compartment, a third frame coupled to third compartment, a first slide assembly coupling the first frame to the second frame such that the second compartment is slideable relative to the first compartment between a first position and a second position, and a second slide assembly coupling the second frame to the third frame such that the third compartment is slideable relative to the second compartment between a third position and a fourth position. In the first position the second compartment is at least partially disposed within the first compartment and in the second position the second compartment is at least partially disposed outside the first compartment. In the third position the third compartment is at least partially disposed within the second compartment and in the fourth position the third compartment is at least partially disposed outside the second compartment.

Aspects of the present invention also provide a hitch assembly comprising a base arm having a first end and an opposing second end, a first mating arm coupled with the first end of the base arm, a second mating arm coupled with the second end of the base arm, and a bias member coupling the first mating arm to the second mating arm.

Aspects of the present invention also provide a hitch assembly comprising a base arm having a first end opposing a second end, and a longitudinal axis extending from the first end to the second end, a first mating arm having an elongated portion and a coupling portion extending substantially perpendicularly to the elongated portion, the coupling portion of the first mating arm being coupled with the first end of the base arm, a second mating arm having an elongated portion and a coupling portion extending substantially perpendicularly to the elongated portion, the coupling portion of the second mating arm being coupled with the second end of the base arm, and a bias member coupling the first mating arm to the second mating arm and extending substantially in a direction of the longitudinal axis of the base arm.

Figure 2:
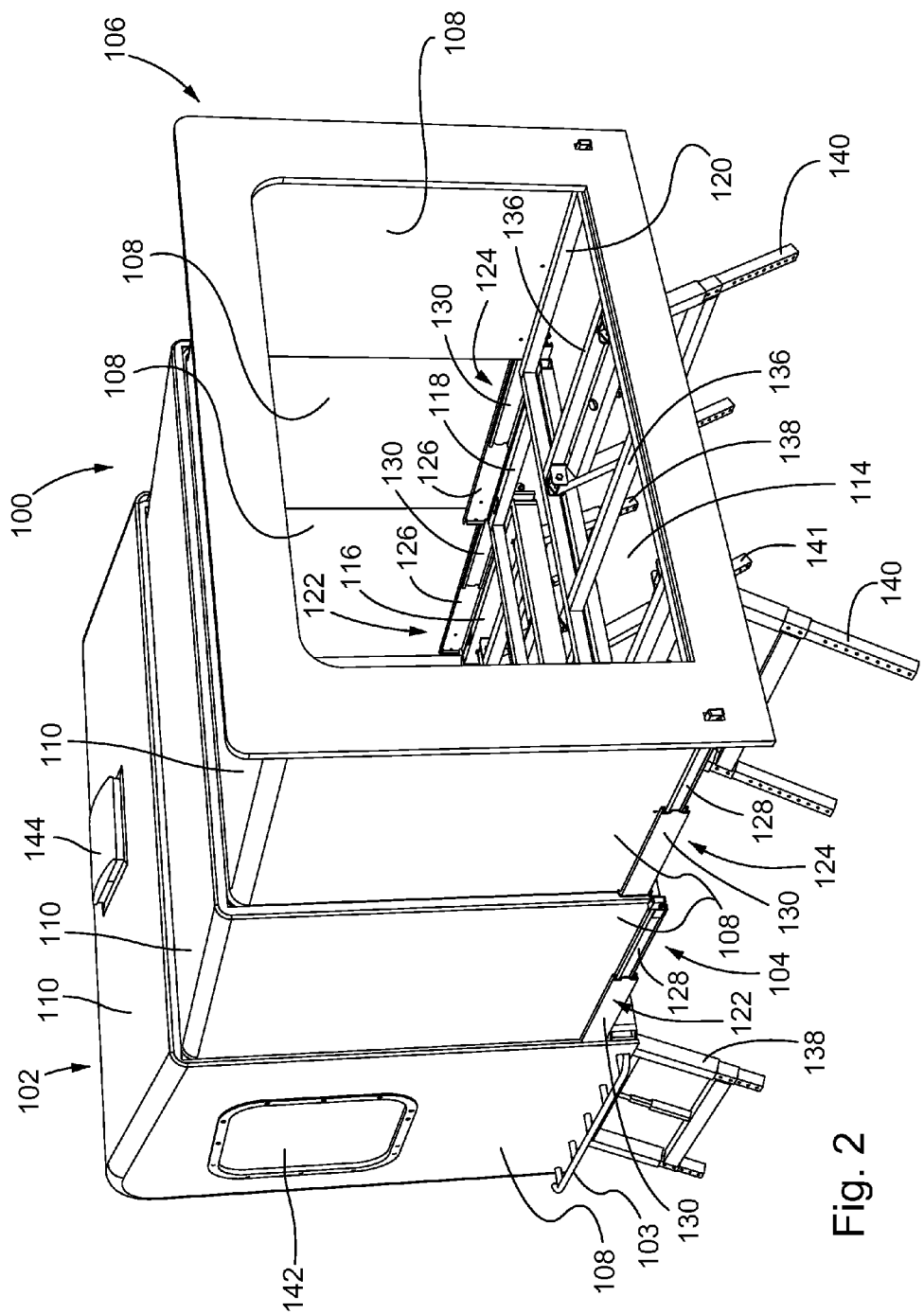
FIG. 2 is a perspective view of the extendable compartment trailer assembly of FIG. 1 in a fully extended position.
Figure 3:
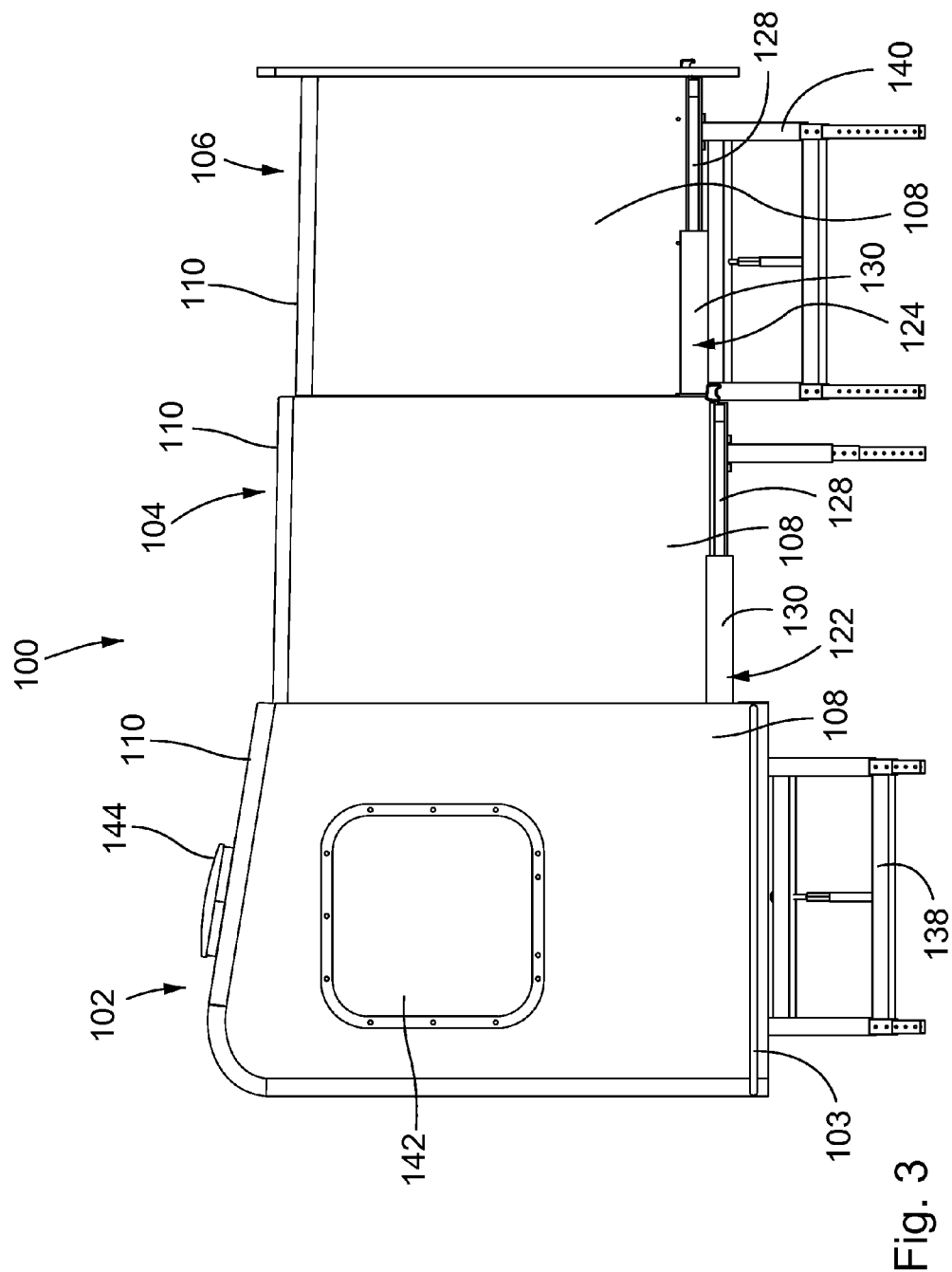
FIG. 3 is a side view of the extendable compartment trailer assembly of FIG. 2 in a fully extended position.

Aspects of the present invention also provide an extendable compartment and hitch assembly comprising an extendable compartment assembly and a hitch assembly. The hitch assembly comprises a first compartment, a second compartment, a first frame coupled to the first compartment, a second frame coupled to the second compartment, and a slide assembly coupling the first frame to the second frame such that the second compartment is slideable relative to the first compartment between a first position and a second position. The hitch assembly comprises a base arm having a first end and an opposing second end, a first mating arm coupled with the first end of the base arm, a second mating arm coupled with the second end of the base arm, and a bias member coupling the first mating arm to the second mating arm. The hitch assembly is coupleable with the extendable compartment assembly FIG. 1 shows a side view of an example extendable compartment trailer assembly 100 in a fully retracted position. FIG. 2 shows a perspective view of the extendable compartment trailer assembly 100 in a fully extended position. FIG. 3 shows a side view of the extendable compartment trailer assembly 100 in a fully extended position. As shown in FIG. 1-3, the extendable compartment trailer assembly 100 may include a first compartment 102, a second compartment 104, and a third compartment 106. The compartments may comprise any suitable material such as aluminum, fiber glass, plastic, wood, steel, and the like. As shown in FIGS. 1-3, each compartment 102, 104, 106 may include opposing sidewalls 108 and a ceiling 110. The sidewalls 108 together with the ceilings 110 define a volume of space. The first compartment 102 may have a rear wall 112. The first compartment 102 may include an open end facing/opposing the rear wall 112. The open end of the first compartment allows for the second compartment 104 and third compartment 106 to nest within the first compartment 102, which is described below. Similarly, the second compartment 104 may have a rear open end and an opposing front open end. The rear open end of the second compartment 104 faces the rear wall 112 of the first compartment 102. The third compartment 106 may include a rear open end facing the rear wall 112 of the first compartment 102 and an opposing doorway opening 114. The doorway opening may 114 may include a door. In other words, the rear wall 112 and open end of the first compartment 102, the opposing open ends of the second compartment 104, and the open end and doorway 114 of the third compartment 106, may all be oriented parallel to each other, e.g., in parallel planes. Any of the compartments may include a window or vent. In the example embodiment shown in FIG. 2, the first compartment 102 includes a window 142 and a vent 144. The first compartment 102 may include a handle 103 for assisting in maneuvering the extendable compartment trailer assembly 100, such as by the operator grabbing the handle.

As best seen in FIG. 3, the second compartment 104 may be slightly smaller than the first compartment 102, while the third compartment 106 may be slightly smaller than the second compartment 104. In particular, at least the height and width of the second compartment 104 may be smaller than the height and width of the first compartment 102 to allow the second compartment 104 to fit within the first compartment 102. The height and width of the third compartment 106 may similarly be smaller than the height and width of the second compartment 104 to allow the third compartment 106 to fit within the second compartment 104. Thus, the second compartment 104 may have a smaller volume than the first compartment 102, while the third compartment 106 may have a smaller volume than the second compartment 104. The length of the second compartment 104 need not necessarily be smaller than the length of the first compartment 102, and similarly the third compartment length need not necessarily be smaller than the length of the first compartment. However, slightly smaller lengths provide the most compact overall length when the extendable compartment trailer assembly is in the completely retracted position.

The difference in overall length of the extendable compartment trailer assembly 100 in the fully retracted position as compared to the fully extended position is best seen by comparing FIG. 1 to FIG. 3. As seen when comparing FIGS. 1 and 3, the overall length of the extendable compartment trailer assembly 100 is about three times longer in the fully extended position (FIG. 3) as compared to the fully retracted position (FIG. 1). The overall reduction in length may vary based on the number of compartments. Generally, the overall reduction in length is proportional to the number of compartments. Thus, with three compartments, the overall length in the fully retracted position is about ⅓ the overall length in the fully extended position, while with two compartments the overall length in the fully retracted position is about ½ the overall length of the fully extended position. Similarly, with four compartments the overall length in the fully retracted position is about ¼ the overall length of the fully extended position, etc.

Figure 4:
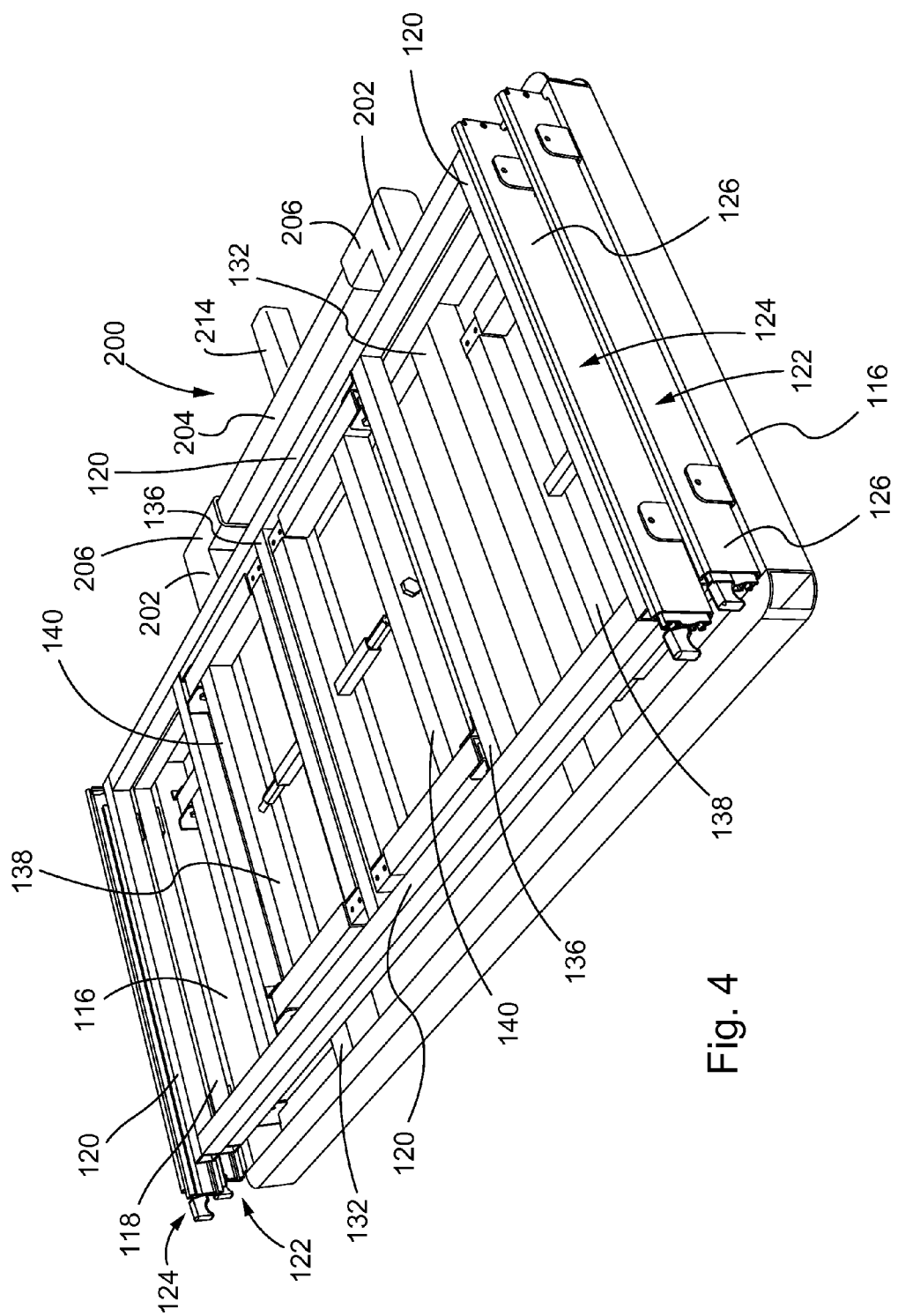
FIG. 4 is a perspective view of the extendable compartment trailer assembly of FIG. 1 with the compartments omitted and hitched to a vehicle in a first hitched position, and in a fully retracted position.
Figure 5:
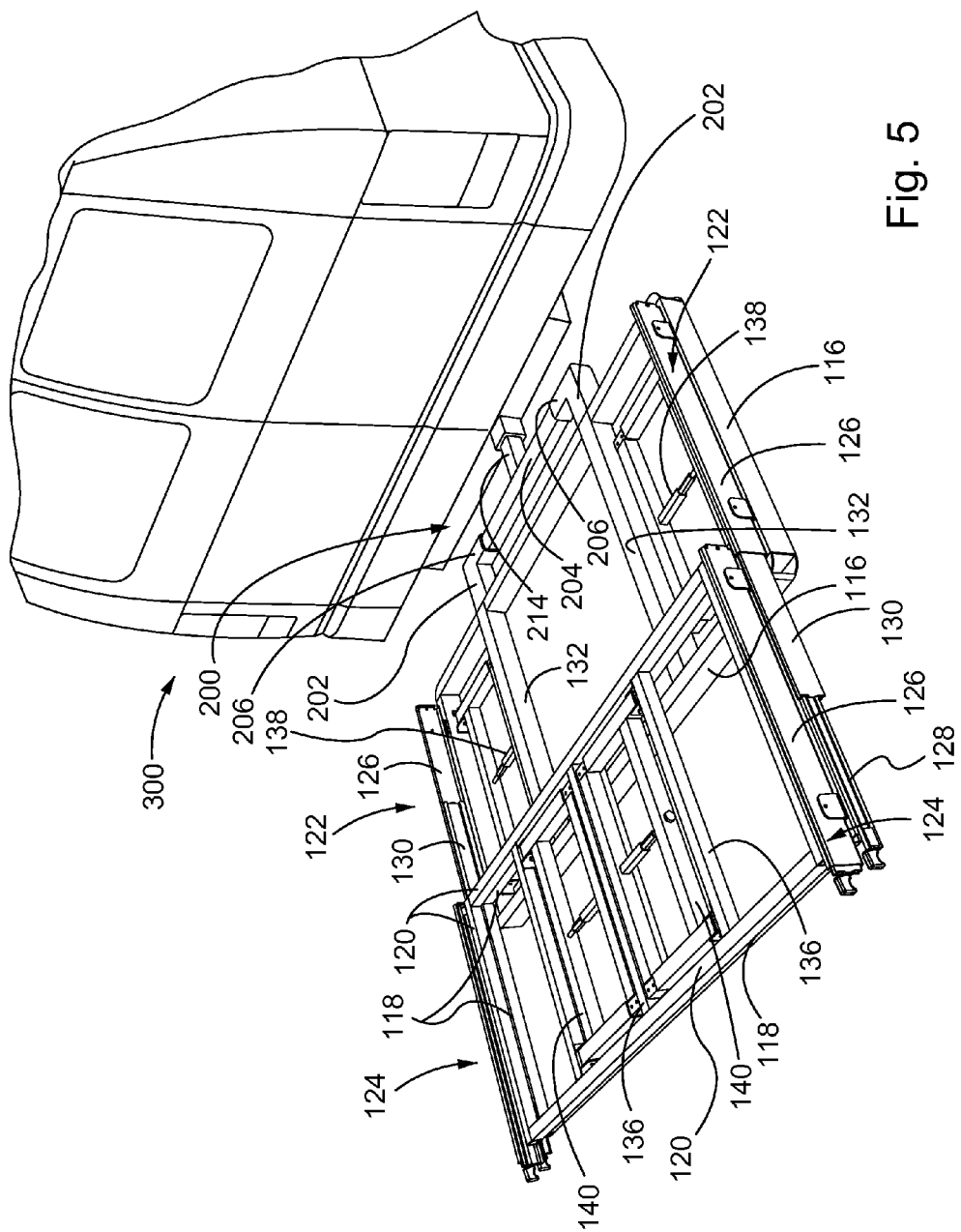
FIG. 5 is a perspective view of the extendable compartment trailer assembly of FIG. 1 with the compartments omitted, in a partially extended position.
Figure 6:
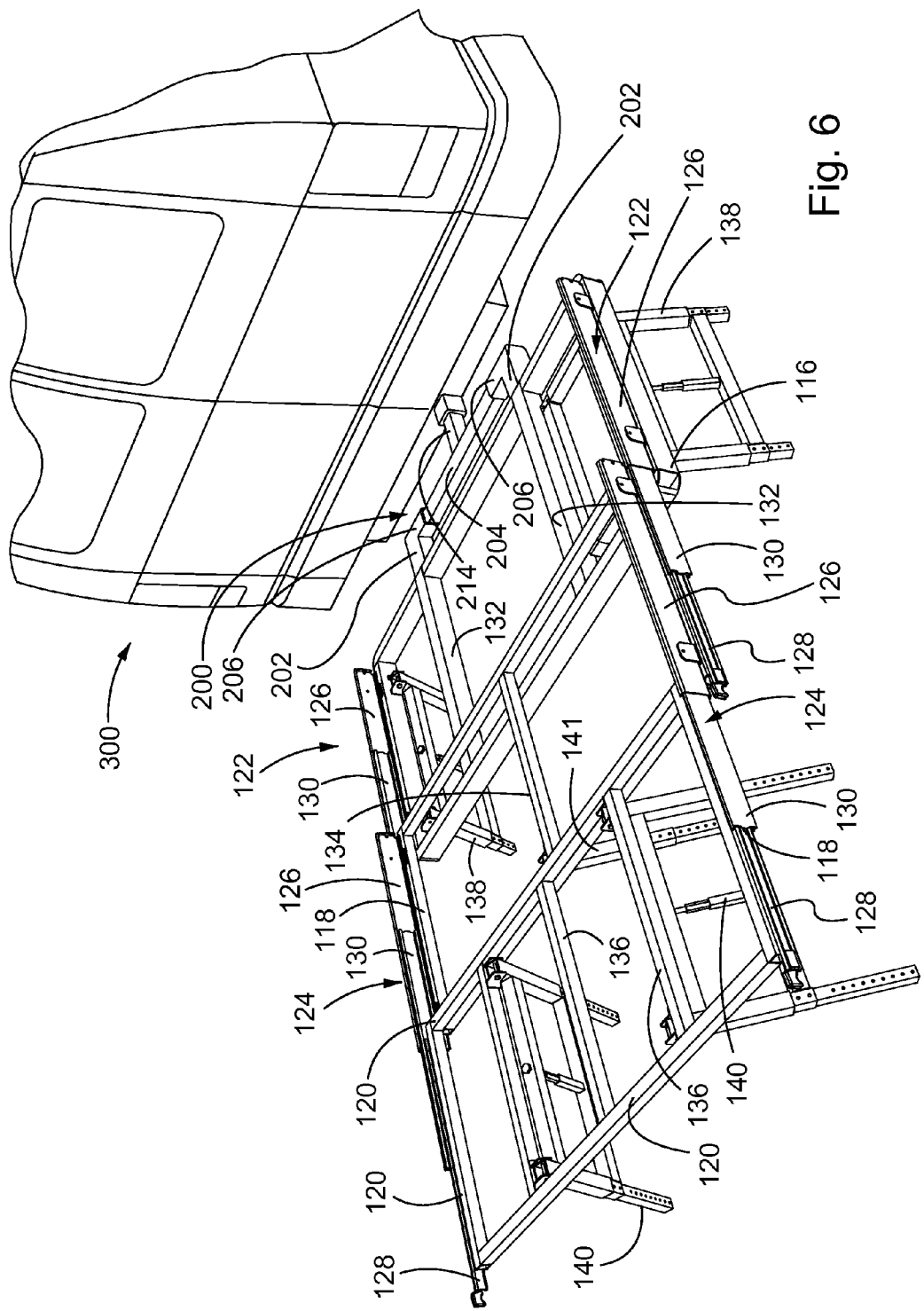
FIG. 6 is a perspective view of the extendable compartment trailer assembly of FIG. 1 with the compartments omitted, in a fully extended position.

The ability to retract and extend the compartments is achieved through a plurality of frames and sliding assemblies, which are best seen in FIGS. 4-6. In each of FIGS. 4-6, the compartments 102, 104, 106 have been omitted for clarity. Thus, FIGS. 4-6 show only the frames and sliding assemblies of the extendable compartment trailer assembly 100. FIG. 4 is a perspective view of the frames and sliding assemblies in the fully retracted position. FIG. 5 is a perspective view of the frames and sliding assemblies in a partially extended position. FIG. 6 is a perspective view of the frames and sliding assemblies in a fully extended position. The extendable compartment trailer assembly 100 may include a first frame 116, a second frame 118, and a third frame 120. The frames may comprise any suitable material such as aluminum, plastic, wood, steel, and the like. Each of the frames may be coupled to a corresponding one of the compartments 102, 104, 106. Specifically, first compartment 102 may be coupled to the first frame 116, the second compartment 104 may be coupled to the second frame 118, and the third compartment 106 may be coupled to the third frame 120. The coupling may be achieved via any suitable method in the art such as by bolting through a series of brackets. Each of the frames 116, 118, 120 may comprise a generally rectangular shape defined by four connected beams, where the four connected beans are the sides of the rectangle. Other shapes, such as squares are also suitable.

The extendable compartment trailer assembly 100 may further include first and second sliding assemblies 122, 124. The first slide assembly 122 slideably couples the first frame 116 with the second frame 118, while the second slide assembly 124 slideably couples the second frame 118 with the third frame 120. As best seen in FIG. 5, the first slide assembly 122 and the second slide assembly 124 may each include two slide assemblies on opposing sides of the frames. Thus, there may be a total of four slide assemblies in a three-compartment trailer assembly. Any slide assembly of sufficient strength to support and move the compartments may be used for the sliding assemblies. Each slide assembly includes a first component 126 coupled with one of the frames, a second component 128 that coupled with the adjacent frame, and a third component 130 coupled between the first component 126 and second component 128 to allow for relative sliding of second component 128 relative to the first component 126. For example, for the first slide assembly 122, the first component 126 may be coupled to the first frame 116, the second component 128 may be coupled to the adjacent second frame 118, and the third component 130 may be coupled between the two components 126, 128. Similarly, for the second slide assembly 124, the first component 126 may be coupled to the second frame 118, the second component 128 may be coupled to the adjacent third frame 120, and the third component 130 may be coupled between the two components 126, 128. The slide assemblies have the same parts and operate in the same manner as existing slide assemblies. For example, similar structural components of a slide assembly in a desk drawer may be suitable, albeit using a higher strength material. Any suitable sliding assembly may be used so long as the material is chosen such that the slide assemblies can sufficiently support the weight of the compartments. For example, the first component 126 and the second slide component 128 may each be in the form of a bracket with a lip. The third component 130 may have a shape corresponding with and slideable along the lips of the brackets. One or more of the brackets may have wheels or ball bearings to allow for the reduced friction sliding. The sliding assemblies may include one or more stops to prevent the second or third components from sliding completely out of engagement. Example slide assemblies can be found in U.S. Pat. Nos. 8,740,321, 6,854, 816, 6,431,668, 5,895,101 4,944,605, 4,077,677, 3,9123, 413, 3,588,198, and 2,675,277, each of which is hereby expressly incorporated by reference herein.

As shown in FIG. 4, in the entirely retracted position, the second frame 118 is on top of the first frame 116 and the third frame 120 is on top of the second frame 118. In this position, the first slide assemblies 122 on both sides of the first and second frames 116, 118 are completely retracted. Similarly, the second slide assemblies 124 on both sides of the second and third frames 118, 120 are completely retracted. FIG. 5 shows a position where the second frame 118 extended relative to the first frame 116, while the third frame 120 remains retracted relative to the second frame 118. As shown in FIG. 5, in this position, the second frame 118 is no longer on top of the first frame 116, while the third frame 120 is on top of the second frame 118. In this position, the first slide assembly 122 on both sides of the first and second frames 116, 118 is extended, while the second slide assembly 124 on both sides of the second and third frames 118, 120 is retracted. FIG. 6 shows a position where the second frame 118 extended relative to the first frame 116 and the third frame 120 is extended relative to the second frame 118. As shown in FIG. 6, in this position, the second frame 118 is no longer on top of the first frame 116 and the third frame 120 is no longer on top of the second frame 118. In this position, the first slide assembly 122 on both sides of the first and second frames 116, 118 is extended and the second slide assembly 124 on both sides of the second and third frames 118, 120 is extended. As noted above, it should be understood that the compartments are omitted in FIGS. 4-6 for clarity. While the weight of the compartments may be sufficient to prevent unintended retraction of the compartments, a locking mechanism may also be included. The locking mechanism may be any mechanism suitable for preventing relative movement of the compartments when the locking mechanism is engaged. For example, a locking pin may be inserted into the travel path of the frames or of the components of the sliding assemblies.

Each of the frames 116, 118, 120 may include one or more support arms to provide further support and stability to the frame. For example, the first frame 116 may include two support arms 132, the second frame 118 may include one support arm 134, and the third frame 120 may include two support arms 136. However, more or less support arms may be used. Each of the support arms may extend across the length of the area defined by the beams of the respective frames.

The extendable compartment trailer assembly may include a plurality of pivotable standing legs that provide additional support to the extendable compartment trailer assembly when in use. For example, as shown in FIGS. 4 and 6, a pivotable leg 138 may be attached to opposing sides of the first frame 116, a pivotable leg 140 may be attached to each of the support arms 136 of the third frame 120, and a pivotable leg 141 may be attached to the support arm 134 of the second frame 118. Each of the pivotable legs 138, 140, 141 may be pivotally attached to the respective frame so that the operator can retract the legs into a stored position (i.e., in approximately the same plane as the frame) when not in use (see FIG. 4). When in use, the pivotable legs 138, 140, 141 may be pivoted so that the legs extend downwardly (i.e., perpendicular to plane of the frames) and contact the ground. Each of the pivotable legs 138, 140, 141 may have adjustable heights, such as via a pin/locking feature. It should be understood that the pivotable legs can be attached to any of the sides/support arms of the frames. Furthermore, more or less legs may be used when more or less support is necessary.

Figure 7:
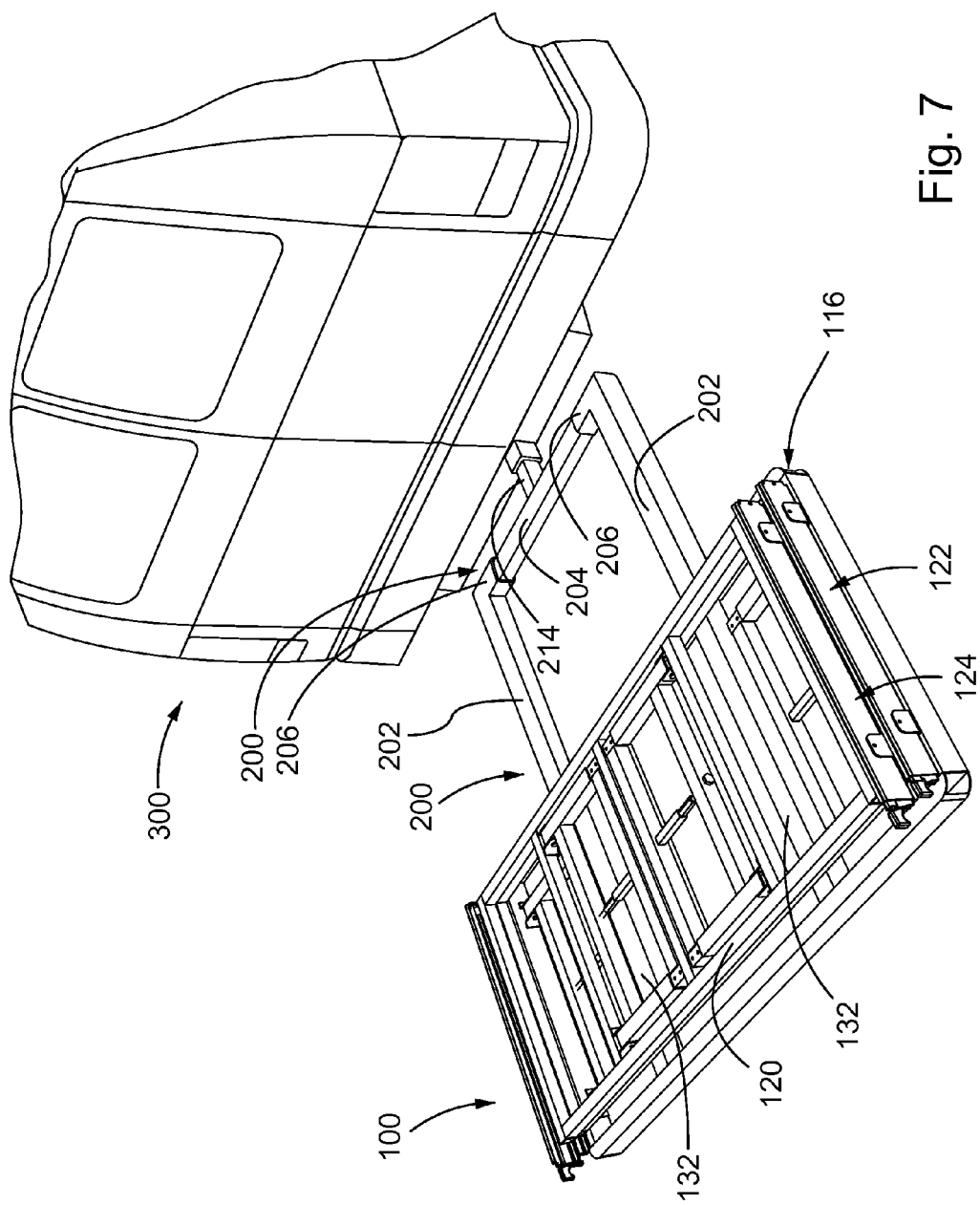
FIG. 7 is a perspective view of the extendable compartment trailer assembly of FIG. 1 with the compartments omitted, in a fully retracted position, and in a second hitched position.
Figure 8:
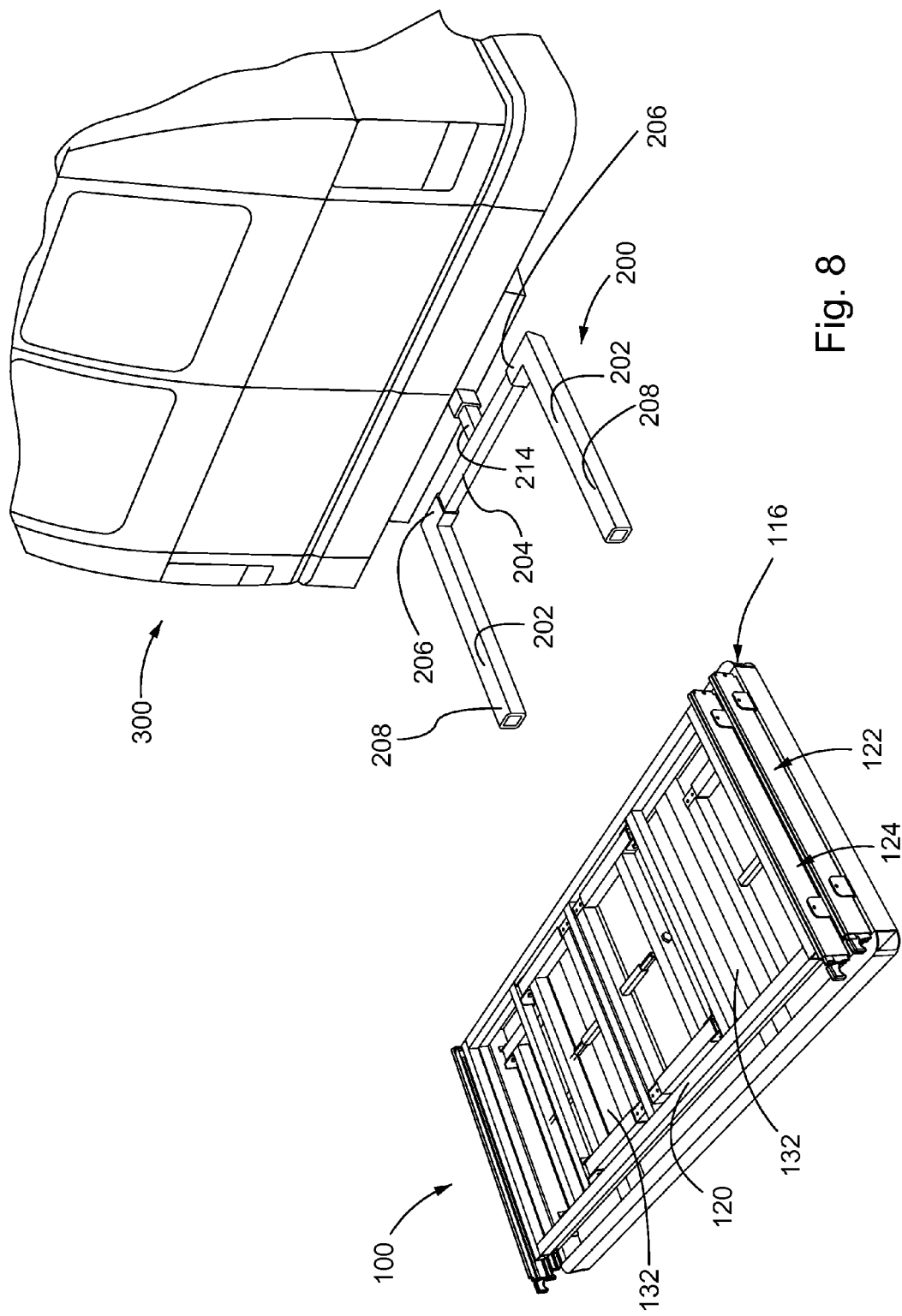
FIG. 8 is a perspective view of the extendable compartment trailer assembly of FIG. 1 with the compartments omitted, in a fully retracted position, and unhitched from the vehicle.

Each of the support arms 132 of the first frame 116 may be hollow to receive a mating arm 202 of a hitch assembly 200. For example, each of the support arms 132 and the mating arms 202 may be in the form of a rectangular prism having a square cross section. The support arms 132 may be slightly larger in height and width than the mating arms 202 so that the mating arms 202 may slide inside the support arms 132. A locking pin (not shown) may be used to secure the mating arms 202 within the support arms 132. For example, each of the support arms 132 and the mating arms 202 may include holes located such that when the mating arms 202 are fully inserted into the support arms 132, the holes are aligned. Then, the locking pin may be inserted into the aligned holes to prevent movement of the mating arms 202 within the support arms 132. FIG. 4 best shows the hitch assembly 200 fully coupled with the extendable compartment trailer assembly 100. The lengths of the mating arms 202 and the support arms 132 may be substantially equal. FIG. 7 best shows the hitch assembly 200 partly decoupled from the extendable compartment trailer assembly 100. As shown in FIG. 7, the mating arms 202 are partially inserted into the support arms 132. FIG. 8 best shows the extendable compartment trailer assembly 100 completely decoupled from the hitch assembly 200.

Figure 10:
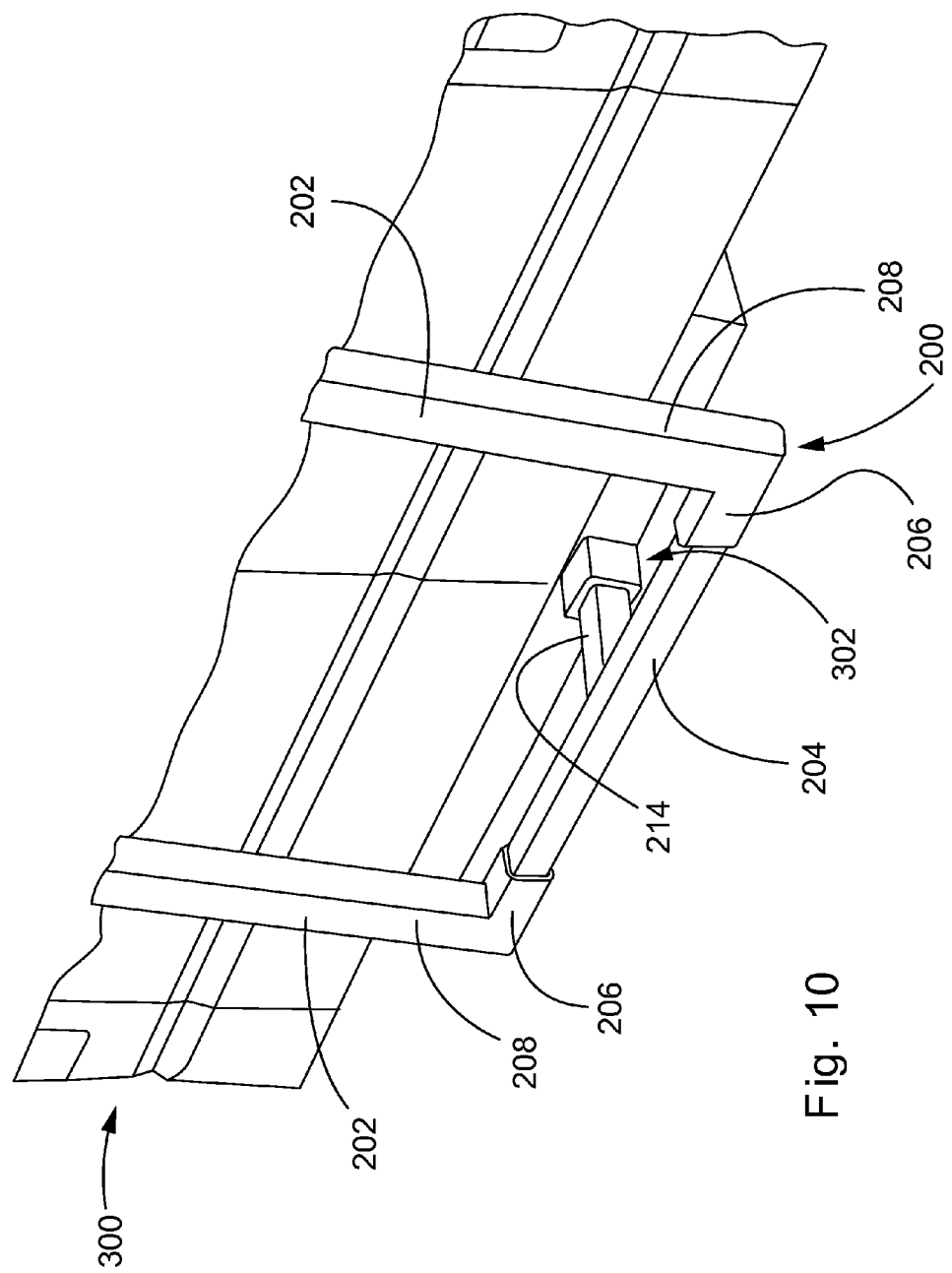
FIG. 10 is a close up perspective view of a portion of the hitch assembly of FIG. 9.

The hitch assembly 200 may include the two opposing mating arms 202 and a base arm 204. Each of the mating arms 202 may have an "L" shape and may be coupled with the base arm 204. The coupling portion 206 of the mating arms 202 extend perpendicularly to an elongated portion 208 of the mating arms 202. The base arm 204 may be a substantially straight piece extending parallel to the coupling portion 206 and perpendicularly to the elongated portion 208. The base arm 204 may have approximately the same shape as the coupling portion 206, but may be slightly smaller in width and height so as to fit within the coupling portion 206. A non-circular cross section, e.g., a square cross section, is preferred to avoid unintended rotation of the mating arms 202 relative to the base arm 204. FIG. 10 best shows a close up view of the mating arms 202 being coupled with the base arm 204.

Figure 11:
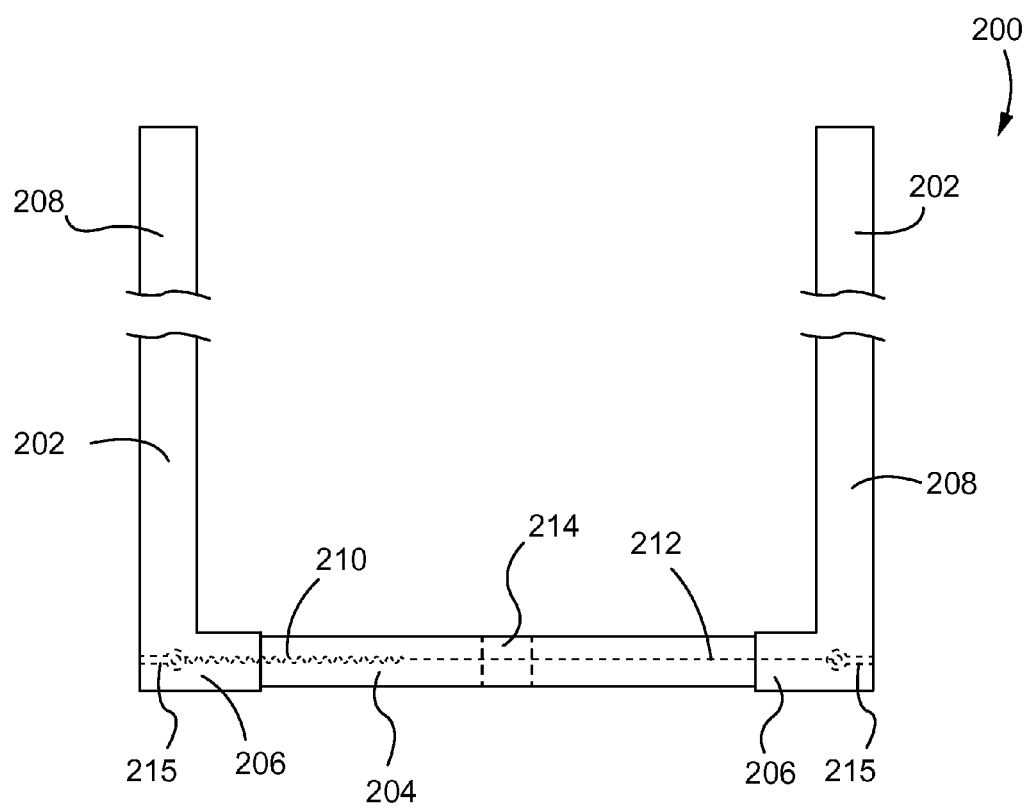
FIG. 11 is a front view showing the internal components of the hitch assembly of FIG. 10.

The mating arms 202 may be coupled to base arm 204 without the risk of the mating arms 202 inadvertently decoupling form the base arm. FIG. 11 is a schematic view showing internal components (shown in dashed line) of the hitch assembly 200 and best illustrates the coupling of the mating arms 202 with the base arm 204. As shown in FIG. 11, the mating arms 202 and the base arms 204 may be hollow. Within the hollow space of one of the mating arms 202 where the coupling portion 206 meets the elongated portion 208 of "L" shape, a bias member 210 (e.g., a spring) may be mounted, while in the hollow space of the other of the mating arms a cable 212 (e.g., a steel cable) may be mounted. For example, mounting rings 215 may be implemented to mount the bias member 210 and cable 212. While the spring is shown mounted on the left mating arm and the cable is mounted to the right mating arm in FIG. 11, it should be understood that their positions may be reversed. Furthermore, while a spring and cable combination are shown, a single bias member (e.g., a single spring) may be used in place of the spring/cable combination, where the spring extends from one mounting ring to the other mounting ring. Additionally, it should be understood that any attachment mechanism may be implemented that is suitable for coupling the two opposing mating arms 202.

Due to the bias member 210 and the cable 212, the operator can pull either one of the mating arms 202 in a direction away from the base arm 204 against the spring force until the mating arm 202 is free from the base arm 204 (e.g., the mating arm is no longer surrounding base arm). While maintaining the pulling force against the spring force such that the mating arm 202 is free from the base arm 204, the operator may rotate the mating arm 202 about a longitudinal central axis of the base arm 204, and then release the pulling force on the mating arm 202. The bias member 210 and cable 212 ensures that the mating arm 202 will return to its coupled position with the base arm 204 when the pulling force is removed. The bias member 210 and cable 212 also prevents both mating arms 202 from being lifted from the base arm at the same time because pulling outwardly on one of the arms also pulls the opposing mating arm. In this manner, the mating arms 202 can be rotated, one at a time, from the vertical orientation shown in FIGS. 9 and 10, to the horizontal orientation shown in FIGS. 7 and 8, and vice versa. A locking mechanism (not shown) may be implemented to lock the mating arms 202 to the base arm 204. For example, a locking pin may be used that extend through a hole in each of the coupling portions 206 and into a corresponding holes of the base arm 204, thus preventing movement of the mating arms 202.

The hitch assembly 200 may be coupled with a vehicle 300 by inserting the hitch assembly 200 into a hitch receiving element 302. A vehicle attachment arm 214 may extend from a center of the base arm 204. The vehicle attachment arm 214 may be inserted into the hitch receiving element 302 of the vehicle 300 (best seen in FIG. 10). The hitch assembly 200 may then be secured to the vehicle 300 within the hitch receiving element 302 using any suitable securing mechanism. For example, a preferred attachment mechanism is known in the art as a "silent hitch pin." The silent hitch pin is so named because it allows for a secure connection that limits wobbling of the hitch assembly 200 within the hitch receiving element 302. However, any other suitable hitch attachment mechanism may be implemented.

The extendable compartment trailer assembly 100 may further include floor boards (not show) that are mounted to the frames 116, 118, 120, thus providing a floor to each of the compartments 102, 104, 106. That is, a first floor board may be connected to the first frame 116, a second floor board may be coupled with the second frame 118, and a third floor board may be coupled to the third frame 120. The extendable compartment trailer assembly 100 may also include leveling structures of various heights placed on at least the first and second floor boards to account for the height differential between each of the floors of the compartments. The leveling structure may comprise foam/cushioning material. Due to the retracting ability of the frames, the floor board of the first compartment is lower than the floor board of the second compartment, while the floor board of the second compartment is lower than the floor board of the third compartment. For example, if the different in heights of the floor boards between the first and second compartments is 1 inch, and the difference in height between the second floor bard and the third floor board is also 1 inch, then the extendable compartment trailer assembly may include a first leveling structure placed on the first floor board that is the same dimensions in length and width as the first floor board, but have 2 inches in thickness. Similarly, a second leveling structure having the same length and width dimensions of the second floor board, but having a thickness of 1 inch may be placed on the second floor board. In other words, the surfaces of all three floors may be made coplanar by providing foam/cushion leveling structures of appropriate thickness. In this manner, once the leveling structures are inserted, there will be a level floor across all the compartments. The leveling structure may be removable so that the extendable compartment trailer assembly can be retracted. While foam/cushion is a preferred material, any material that allows for a level floor may be used, such as the same material as the floor board.

Figure 9:
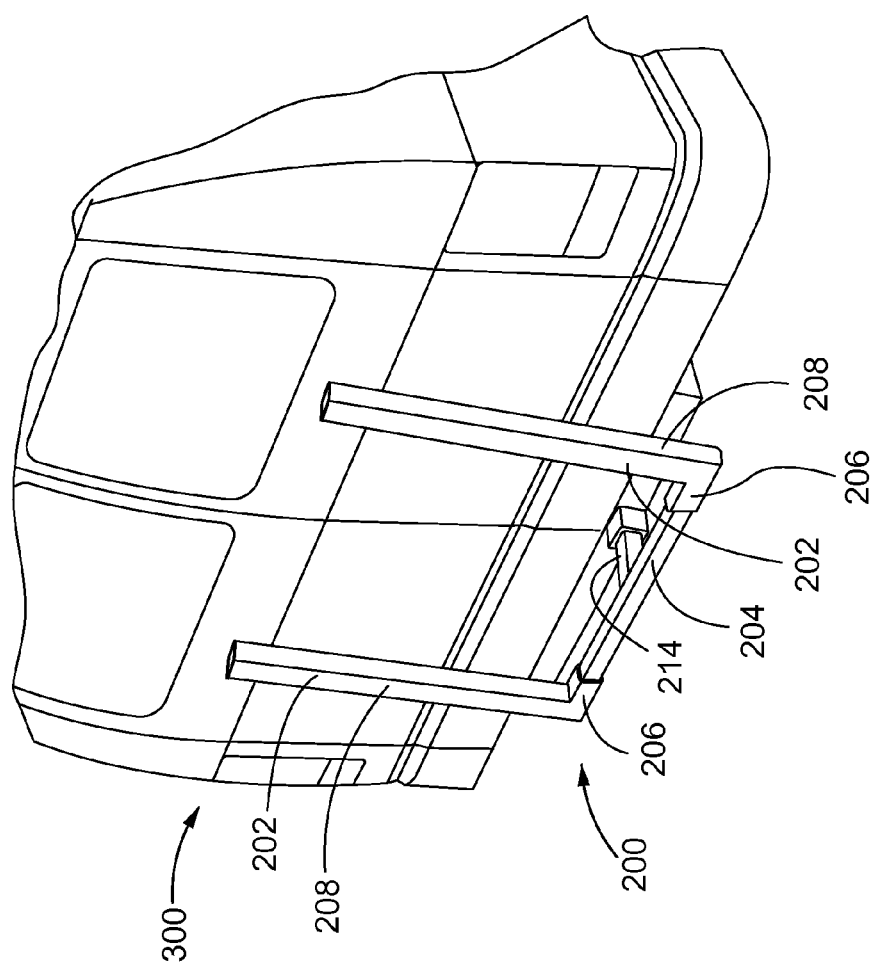
FIG. 9 is a perspective view of a hitch assembly in a non-use position in accordance with aspects of the present invention.

A method of operating the extendable compartment trailer assembly 100 will now be described. The method may begin from the completely unassembled orientation, shown in FIG. 9. As shown in FIG. 9, the hitch assembly 200 is attached to the vehicle 300 and the extendable compartment trailer assembly 100 is completely absent. While FIG. 9 shows the hitch assembly 200 already attached to the vehicle, the method may include first attaching the hitch assembly 200 to the vehicle by inserting the vehicle attachment arm 214 into the hitch receiving element 302 and then securing the two with a hitch pin, such as the above-mentioned silent hitch pin. As shown in FIG. 9, prior to coupling extendable compartment trailer assembly 100 to the hitch assembly 200, the mating arms 202 may be extended vertically, which is the non-use/prior to use position. In this position, the operator can freely drive the vehicle 300 without needlessly having the hitch assembly 200 extended rearward when nothing is being carried on the hitch assembly 200.

When the operator is ready to couple the extendable compartment trailer assembly 100 to the hitch assembly 200, the operator first needs to rotate the mating arms 202 from the vertical position of FIG. 9, to the horizontal position shown in FIG. 8. The operator achieves this by pulling one of the mating arms 202 in a direction along a longitudinal centerline axis of the base arm 204 in a direction away from the opposing mating arm 202. The operator must pull hard enough to overcome the spring force of the bias member 210. Once the operator has pulled the mating arm 202 off of the base arm 204, the operator can then rotate the mating arm 202 90 degrees in a direction away from the vehicle 300. Once the rotation is complete, the operator may release the pulling force and the mating arm will then re-couple with the base arm 204, but now in the horizontal position shown in FIG. 8. The same step is then repeated for the other one of the mating arms 202. After the rotation is performed for the second mating arm 202, the hitch assembly 200 is positioned as shown in FIG. 8.

Next, the operator may couple the extendable compartment trailer assembly 100 to the hitch assembly 200 by inserting the mating arms 202 into the support arms 132 of the first frame 16. FIG. 7 shows partial insertion of the mating arms 202 into the support arms 132. The position shown in FIG. 7 may be performed at any time when necessary to open to rear doors of the vehicle. The compartments are not shown in FIG. 7, but the compartments would block opening of the vehicle rear door when the mating arms 202 are fully inserted into the support arms 132. The operator may continue to slide the mating arms 202 all the way into the support arms 132. Alternatively, the operator may slide the mating arms 202 partially into the support arms 132 (e.g., one-half the distance of the support arms 132). Inserting the mating arms 202 partially allows the operator to have access to, and is able to open, the rear doors of the vehicle. As noted above, a lock pin may be used to lock the mating arms 202 into the support arms 132. Thus, once in position (e.g., either fully or partially), the operator may insert a lock pin that passes through aligned holes of the mating arms 202 and support arms 132. The fully inserted position is shown in FIG. 4. Once fully inserted and locked into place, the operator may then drive the vehicle to any desired location. FIG. 1 shows the fully retracted position with the compartments coupled to the frames. As such, the operator would be able to carry the extendable compartment trailer assembly 100 shown in FIG. 1, as attached to the vehicle as shown in FIG. 4, without the need for road wheels. In this manner, the operator can compactly and easily transport the extendable compartment trailer assembly 100 without the same restrictions presented to a person pulling a full trailer on wheels.

Once the operator arrives at the location, the operator may then proceed to extend the extendable compartment trailer assembly 100. After arriving at the desired location, the extendable compartment trailer assembly 100 is in the fully retracted orientation shown in FIGS. 1 and 4. If locked, the operator may unlock the frames such as by removing a locking pin. The operator may then grab the second and third compartments 104, 106 and begin pulling the compartments 104, 106 in a direction away from the first compartment 102. The midway point in this process is shown in FIGS. 2 and 5. The sliding of the compartments occurs due to the slide assemblies 122, 124. The operator may continue to pull the compartments 104, 106 until the fully extended position is reached, which is shown in FIGS. 2, 3, and 6.

After fully extending the extendable compartment trailer assembly 100, the operator may then proceed to pivot the pivotable legs 138, 140, 141 and adjust the leg heights until the legs 138, 140, 141 are in contact with ground. Once the legs are pivoted, the user may then place the above-noted leveling structures onto the floor boards of the first and second compartments. The user may also lock the frames and legs in place such as by inserting locking pins. After placing the leveling structures, the operator may then use the space within the compartments as desired, such as by adding a mattress. The fully extended compartment trailer assembly 100 thus provides the comforts of a conventional trailer.

When the operator is ready to leave the location, the above steps may be repeated in reverse. In short, the operator may remove the leveling structures, raise the pivotable legs 138, 140, 141, and then compress the compartment 104, 106 along with frames 118, 120 into the fully retracted position. Once fully retracted and secured, the operator can continue to travel to another destination.

While not shown, additional compartments may be added using the same concepts described above. For example, the extendable compartment trailer assembly may include 4, 5, 6, etc. compartments. Furthermore, while all the compartment and frames are shown extending in a parallel manner along a common axis, one of the compartments may extend perpendicularly relative to the direction of the other compartments (i.e., along a perpendicular axis). For example, a fourth compartment may extend perpendicular from the third compartment. This may be achieved by having the slide assemblies coupled with the sides of the frame extending perpendicular to the sides on which the other slide assemblies are mounted. Furthermore, while the example figures show the expansion of the compartments horizontally relative to the ground (e.g., the compartments do not change elevation relative to the ground during extension), it should be understood that the same principles may be applied to provide for vertical extension (e.g., one or more compartments may be included that are capable of extending away from the ground to increase the height of the compartment).

Additional advantages and novel features relating to aspects of the present invention will be set forth in part in the description that follows, and in part will become more apparent to those skilled in the art upon examination of the following or upon learning by practice thereof.

The invention claimed is:

1. An extendable compartment assembly comprising:
    a first compartment having opposing sidewalls and a ceiling;
    a second compartment having opposing sidewalls and a ceiling;
    a first frame coupled to the first compartment;
    a second frame coupled to the second compartment;
    a slide assembly coupling the first frame to the second frame such that the second compartment is slideable relative to the first compartment between a first position and a second position,
    wherein in the first position the second compartment is at least partially disposed within the first compartment and in the second position the second compartment is at least partially disposed outside the first compartment, and
    at least one leg coupled to the first frame or the second frame,
        wherein the first frame comprises first and second support arms,
        wherein the second frame comprises one or more support arms, and
        wherein the first and second support arms of the first frame are hollow and configured to receive first and second hitch arms of a hitch assembly.

2. The extendable compartment assembly of claim 1, further comprising a first floor coupled with the first frame and a second floor coupled with the second frame.

3. The extendable compartment assembly of claim 1, wherein the at least one leg comprises a first leg pivotally coupled with the first frame and a second leg pivotally coupled with the second frame.

4. The extendable compartment assembly of claim 1, wherein the one or more support arms comprises a pin hole for receiving a locking pin for locking the hitch arm within the one or more support arms.

5. The extendable compartment assembly of claim 1, wherein the one or more support arms of the first frame comprises first and second support arms, wherein the first support arm is hollow and configured to receive a first hitch arm of a hitch assembly, and wherein the second support arm is hollow and configured to receive a second hitch arm of the hitch assembly.

6. The extendable compartment assembly of claim 1, further comprising a vent disposed in one of the opposing sidewalls or ceiling of at least one of the first or second compartments.

7. The extendable compartment assembly of claim 1, further comprising a window disposed in one of the opposing sidewalls or ceiling of at least one of the first or second compartments.

8. The extendable compartment assembly of claim 1, wherein the first compartment comprises a rear wall and an open end facing the rear wall.

9. The extendable compartment assembly 8, wherein the second compartment comprises an open end facing the rear wall of the first compartment and doorway facing the open end of the second compartment.

10. The extendable compartment assembly of claim 1, wherein in the first position the second compartment is disposed substantially within the first compartment and in the second position the second compartment is disposed substantially outside the first compartment.

11. The extendable compartment assembly of claim 1, wherein the sidewalls of the second compartment have a height smaller than a height of the sidewalls of the first compartment.

12. The extendable compartment assembly of claim 1, wherein a length of the assembly when the second compartment is in the first position is about one-half a length of the assembly when the second compartment is in the second position.

13. An extendable compartment assembly comprising:
    a first compartment having opposing sidewalls and a ceiling;
    a second compartment having opposing sidewalls and a ceiling;
    a first frame coupled to the first compartment;
    a second frame coupled to the second compartment;
    a slide assembly coupling the first frame to the second frame such that the second compartment is slideable relative to the first compartment between a first position and a second position, wherein in the first position the second compartment is at least partially disposed within the first compartment and in the second position the second compartment is at least partially disposed outside the first compartment;
    at least one leg coupled to the first frame or the second frame:
    a third compartment having opposing sidewalls and a ceiling;
    a third frame coupled to the third compartment;
    a second slide assembly coupling the third frame to the second frame such that the third compartment is slideable relative to the second compartment between a third position and a fourth position, wherein in the third position the third compartment is at least partially disposed within the second compartment and in the fourth position the third compartment is at least partially disposed outside the second compartment.

14. The extendable compartment assembly of claim 13, wherein when the second compartment is in the first position and the third compartment is in the third position, the third compartment is at least partially disposed within the first compartment.

15. The extendable compartment assembly of claim 13,
   wherein the wherein the first compartment comprises a rear wall and an open end facing the rear wall,
   wherein the second compartment comprises a first open end facing the rear wall of the first compartment and a second open end facing the first open end, and
   wherein the third compartment comprises an open end facing the rear wall of the first compartment and a doorway facing the open end of the third compartment.

16. The extendable compartment assembly of claim 15, wherein the sidewalls of the third compartment have a height smaller than a height of the sidewalls of the second compartment.

17. The extendable compartment assembly of claim 15, wherein a length of the assembly when the second compartment is in the first position and the third compartment is in the third position is about one-third a length of the assembly when the second compartment is in the second position and the third compartment is in the fourth position.

18. A hitch assembly comprising:
   a base arm having a first end and an opposing second end;
   a first mating arm coupled with the first end of the base arm;
   a second mating arm coupled with the second end of the base arm; and
   a bias member coupling the first mating arm to the second mating arm, wherein the first mating arm and the second mating arm are each configured to move between an engaged position contacting the base arm and a disengaged position separated from the base arm, and wherein the bias member is configured to bias the first and the second mating arms into the engaged position.

19. A hitch assembly comprising:
   a base arm having a first end opposing a second end, and a longitudinal axis extending from the first end to the second end;
   a first mating arm having an elongated portion and a coupling portion extending substantially perpendicularly to the elongated portion, the coupling portion of the first mating arm being coupled with the first end of the base arm;
   a second mating arm having an elongated portion and a coupling portion extending substantially perpendicularly to the elongated portion, the coupling portion of the second mating arm being coupled with the second end of the base arm; and
   a bias member coupling the first mating arm to the second mating arm and extending substantially in a direction of the longitudinal axis of the base arm.

20. An extendable compartment and hitch assembly comprising:
   an extendable compartment assembly comprising:
      a first compartment;
      a second compartment;
      a first frame coupled to the first compartment;
      a second frame coupled to the second compartment;
      a slide assembly coupling the first frame to the second frame such that the second compartment is slideable relative to the first compartment between a first position and a second position; and
      at least one leg coupled to the first frame or the second frame; and
   a hitch assembly comprising:
      a base arm having a first end and an opposing second end;
      a first mating arm coupled with the first end of the base arm;
      a second mating arm coupled with the second end of the base arm; and
      a bias member coupling the first mating arm to the second mating arm,
   wherein the hitch assembly is coupleable with the extendable compartment assembly.

* * * * *